United States Patent [19]
Degura et al.

[11] Patent Number: 5,113,278
[45] Date of Patent: May 12, 1992

[54] COMMUNICATION SYSTEM AND APPARATUS USING CHIP SIGNALS

[75] Inventors: Yasusaburo Degura, Kawasaki; Tetsuo Sakanaka, Sagamihara; Haruo Imano, Yokohama, all of Japan

[73] Assignee: Canon Kabushiki Kaisha, Tokyo, Japan

[21] Appl. No.: 512,261

[22] Filed: Apr. 20, 1990

[30] Foreign Application Priority Data

Apr. 26, 1989 [JP] Japan ................... 1-104763

[51] Int. Cl.$^5$ ........................................... H04B 10/00
[52] U.S. Cl. ................................. 359/154; 359/181; 370/109; 332/112; 342/132; 375/23; 375/1
[58] Field of Search ............... 455/617, 608, 611, 618; 370/109; 375/1, 30, 23; 342/132, 201, 202; 332/112; 330/4.3; 359/154, 181

[56] References Cited

U.S. PATENT DOCUMENTS

| | | | |
|---|---|---|---|
| 3,899,429 | 8/1975 | Ueno et al. | 332/112 |
| 4,793,000 | 12/1988 | Imano et al. | 455/619 |
| 4,918,751 | 4/1990 | Pessot et al. | 455/608 |
| 4,928,316 | 5/1990 | Heritage et al. | 415/617 |

FOREIGN PATENT DOCUMENTS 2-4077  1/1990  Japan ................... 455/617

OTHER PUBLICATIONS

Electronics, Oct. 7, 1960, pp. 53-57.

Primary Examiner—Reinhard J. Eisenzopf
Assistant Examiner—Kinfe-Michael Negash
Attorney, Agent, or Firm—Fitzpatrick, Cella, Harper & Scinto

[57] ABSTRACT

There are provided a communication system and an apparatus for modulating a communication signal into a chirp signal and executing the communication. In the system, a signal to be transmitted is input, a predetermined analog pattern signal is added to the input signal and is pulse position modulated, the modulated signal is converted into the chirp signal, and the chirp signal is output onto a transmission path. The converted chirp signal can be also converted into an optical signal and the optical signal can be also output onto the transmission path. After the analog or digital input signal was pulse position modulated, by converting the modulated signal into the chirp signal, the analog signal can be also transmitted and received as a chirp signal. Thus, the communication reliability can be assured without being influenced by disturbance noises or irrespective of a limitation of a transmission electric power of the transmission path.

19 Claims, 11 Drawing Sheets a: INPUT SIGNAL
b: SAWTOOTH WAVE
c: SUM OF INPUT SIGNAL AND SAWTOOTH WAVE
d: PULSE WIDTH MODULATION WAVE
e: DIFFERENTIATED WAVESHAPE OF PULSE WIDTH MODULATION WAVE
f: PULSE POSITION MODULATION WAVE a: PULSE POSITION MODULATION WAVE
b: COUNTER SAWTOOTH WAVE
c: SUM OF PULSE POSITION MODULATION WAVE AND COUNTER SAWTOOTH WAVE
d: PULSE AMPLITUDE MODULATION WAVE

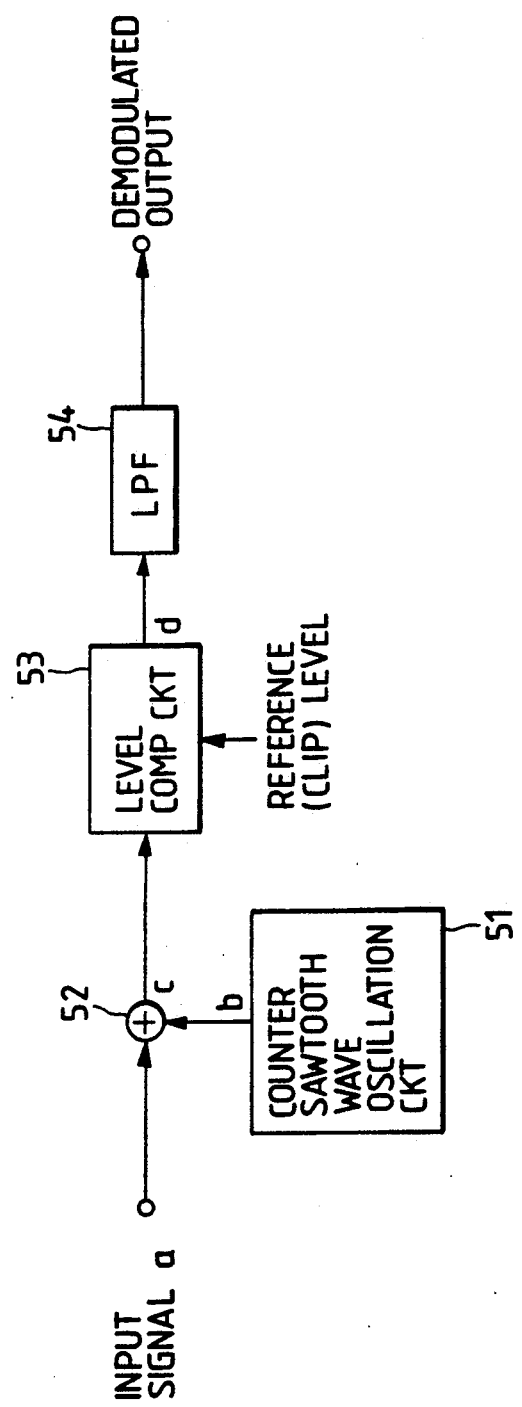

a: DIGITAL SIGNAL
b: SUMMATION CONVERSION OUTPUT
c: PULSE POSITION MODULATION WAVE
d: PULSE POSITION DEMODULATION WAVE
e: ONE TIME SLOT DELAY SIGNAL
f: DISCRIMINATION REPRODUCTION OUTPUT

COMMUNICATION SYSTEM AND APPARATUS USING CHIP SIGNALS

BACKGROUND OF THE INVENTION

1. Field of the Invention

The present invention relates to a communication system and apparatus and, more particularly, to a communication system and apparatus for modulating a signal to be communicated into a chirp signal and executing a communication.

2. Related Background Art

Hitherto, an optical spatial communication for executing a communication by using an aerial propagation of an optical signal has been known. In the optical spatial communication, since it is easily influenced by a disturbance because of the characteristics of a transmission path as an open space, in general, the signal is subjected to a certain kind of modulation and, thereafter, the modulated signal is transmitted rather than the signal in its own form.

In the case of the optical spatial communication, when long distance transmission is executed in the outdoors or the like, the signal light is greatly attenuated in dependence on a meteorological condition such as rain or the like. Therefore, it is necessary to detect a very weak signal. In the case of using the conventional modulating system such as FSK or ASK, there are problems such that the communication distance is limited and the reliability is low.

On the other hand, as an optical spatial communication for a short distance, there has been considered a method of diffusing the signal light to widen a space range where the signal can be received instead of the one-to-one communication. However, even in such a case, since the signal light is very weakened, the conventional transmission system has a drawback such that it is also difficult to assure the reliability of the communication.

Therefore, the applicant of the present invention has proposed a technique for modulating an input signal into a chirp signal and executing the communication in U.S. patent application Ser. No. 368,840.

According to the technique disclosed in U.S. patent application Ser. No. 368,840, a binary digital signal of "1" and "0" is converted into a predetermined code and transmitted or received. As shown in FIG. 11A, a communication is executed by modulating the signal by use of a modulation system in which the presence and absence of a chirp signal cs are respectively made to correspond to a binary digital signal of "1" and "0" by a chirp conversion element 31. Or, as shown in FIG. 11B, a communication is performed by modulating the signal by use of a modulation system in which chirp signals $cs_1$ and $cs_0$ of different patterns are respectively made correspond to a binary digital signal of "1" and "0" by chirp conversion elements 31 and 41.

Waveshapes on the right side in FIGS. 11A and 11B show modulated signals which were formed by the above modulation systems. The chirp signals cs, $cs_1$, and $cs_0$ are obtained by expanding the frequency component of an input signal (square wave pulse) in the direction of a time base by the chirp conversion element 31 or 41 on the basis of different expansion characteristics, respectively.

Particularly, in FIG. 11B, the chirp signals $cs_1$ and $cs_0$ are respectively formed by the chirp conversion elements 31 and 41 and an output signal on the right side in the diagram is obtained by adding those chirp signals.

According to the above system, in the transmitting section, a carrier wave of a predetermined frequency is modulated by pulses which express a transmission digital signal and the chirp signal in which the spectrum component of the modulated signal was expanded in the time base direction is output, while in the receiving section, the spectrum of the chirp signal received is compressed in the time base direction and, thereafter, the compressed signal is detected and the digital data is reproduced. Therefore, there is obtained the same effect as if the transmission energy was increased when the chirp signal is compressed on the reception side, and the apparent S/N ratio can be improved. Therefore, even a very weak signal such that it is difficult to execute the detection and reproduction by the conventional FSK or PSK modulation system can be detected and reproduced and the communication reliability can be improved. Therefore, even in the system for diffusing the signal light such that a number of receiving sections can receive the signal light, the communication can be certainly executed as well as the long distance communication.

However, according to the system of FIG. 11A, the presence and absence of the chirp signal are made correspond to codes "1" and "0" of the digital signal. Therefore, there is an uncertain point in separation and discrimination of the codes "1" and "0". For instance, upon demodulation, there is a possibility such that the code "0" is erroneously decided to be the code "1" due to the influence by noise on the transmission path or the like.

To solve the above problem, the system as shown in FIG. 11B has been considered. However, according to such a system, as will be obvious from the diagram, the chirp conversion elements having different conversion patterns are necessary, while on the reception side as well, counter conversion elements which can detect chirp signals of a plurality of patterns are also obviously needed, so that there are problems such that the circuit construction is complicated, the circuit scale is large, and the costs are high as compared with those of the system of FIG. 11A.

SUMMARY OF THE INVENTION

It is an object of the present invention to solve the foregoing problems and to provide a communication system which can certainly transmit information using chirp signal conversion by a simple cheap construction.

Another object of the invention is to provide analog and digital communication systems which are suitable for the light communication.

Another object of the invention is to provide analog and digital communication systems in which the influence of noises can be reduced and a very weak signal can be detected.

Still another object of the invention is to provide analog and digital communication systems in which by using a surface acoustic wave-dispersive delay line, a communication signal can be converted into a chirp signal by a simple construction.

Further another object of the invention is to provide analog and digital communication system in which in light communication, the S/N ratio and the reliability of the communication can be improved.

Further another object of the invention is to provide a communication system and an apparatus in which after an input signal was pulse position modulated, the modulated signal is converted into the chirp signal, so that it is possible to assure the transmission reliability which is almost equivalent to that in the case where different chirp signals are assigned to a binary signal.

Further another object of the invention is to provide a communication system and an apparatus in which after an input signal was pulse position modulated, the modulated signal is converted into the chirp signal, so that not only a digital signal but also an analog signal can be communicated as chirp signals.

The above and other objects and features of the present invention will become apparent from the following detailed description and the appended claims with reference to the accompanying drawings.

BRIEF DESCRIPTION OF THE DRAWINGS

FIG. 3B is a waveguide a diagram showing the details of a pulse position demodulator;

DETAILED DESCRIPTION OF THE PREFERRED EMBODIMENTS

Figure 1A:
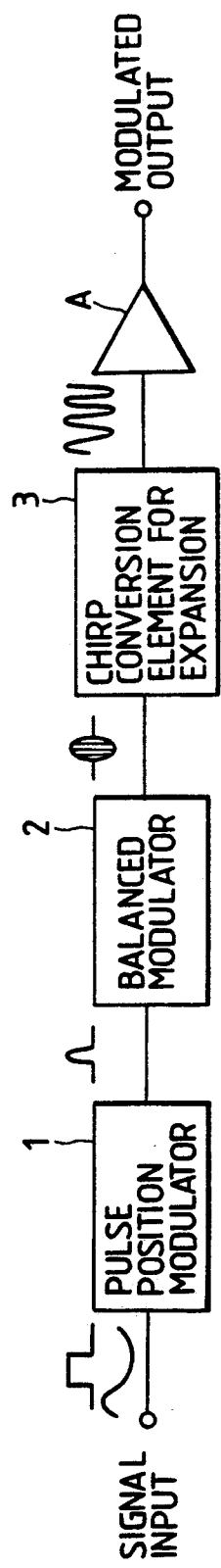
FIG. 1A is a block diagram showing a structure of an apparatus on the transmission side according to a communication system of the invention.

The present invention will be described in detail hereinbelow on the basis of embodiments shown in the drawings.

Figure 1B:
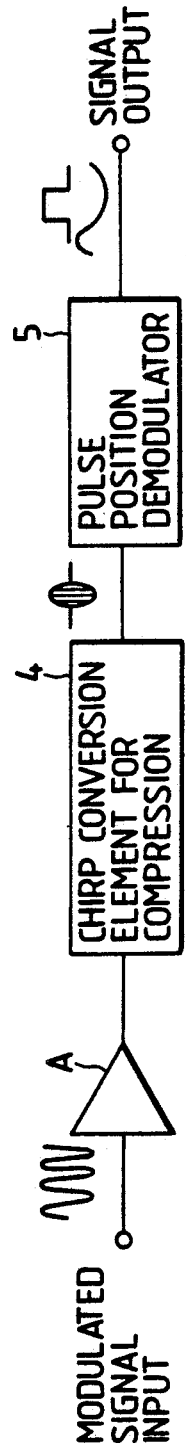
FIG. 1B is a block diagram showing a structure of an apparatus on the reception side according to the communication system of the invention.

FIGS. 1A and 1B show examples of fundamental structures of a transmitting apparatus and a receiving apparatus to which the present invention is applied, respectively.

In FIG. 1A, reference numeral 1 denotes a pulse position modulator for pulse position modulating serial pulses which express an input analog signal or an input binary digital signal.

An output of the pulse position modulator 1 is input to a balanced modulator 2. The balanced modulator 2 converts the pulse position modulated signal which was formed by the pulse position modulator 1 into the waveshape which is suitable to be effectively converted into the chirp signal.

Figure 8:
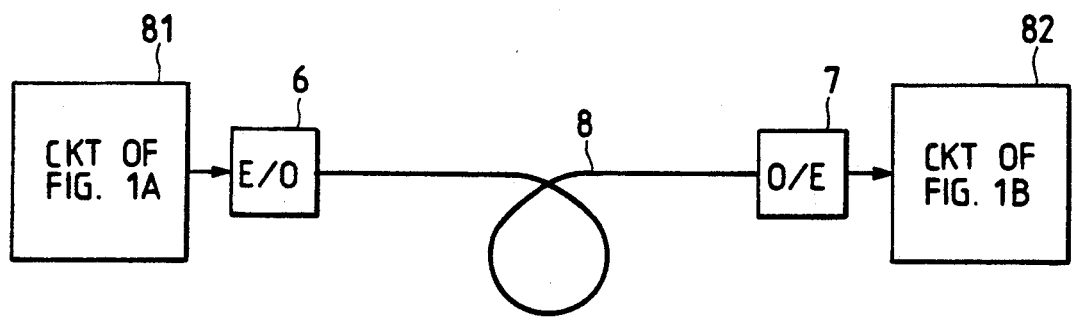

An output of the balanced modulator 2 is input to a chirp conversion element 3 for expansion and its predetermined band component is expanded in the direction of a time base. An output of the element 3 is output to a transmission path through an amplifier A. An optical fiber or the like shown in FIG. 8 is used as a transmission path.

On the other hand, in FIG. 1B, the signal (output of the circuit of FIG. 1A) which was received from the transmission path is amplified to a predetermined level by an amplifier A and, thereafter, the amplified signal is input to a chirp conversion element 4 for compression. The element 4 inversely converts the chirp signal into the pulse position modulated wave. An output of the element 4 is input to a pulse position demodulator 5.

The pulse position demodulator 5 executes the counter conversion of the balanced modulator 2 on the transmission side and demodulates the pulse position modulated wave into the original analog or digital signal.

Figure 2A:
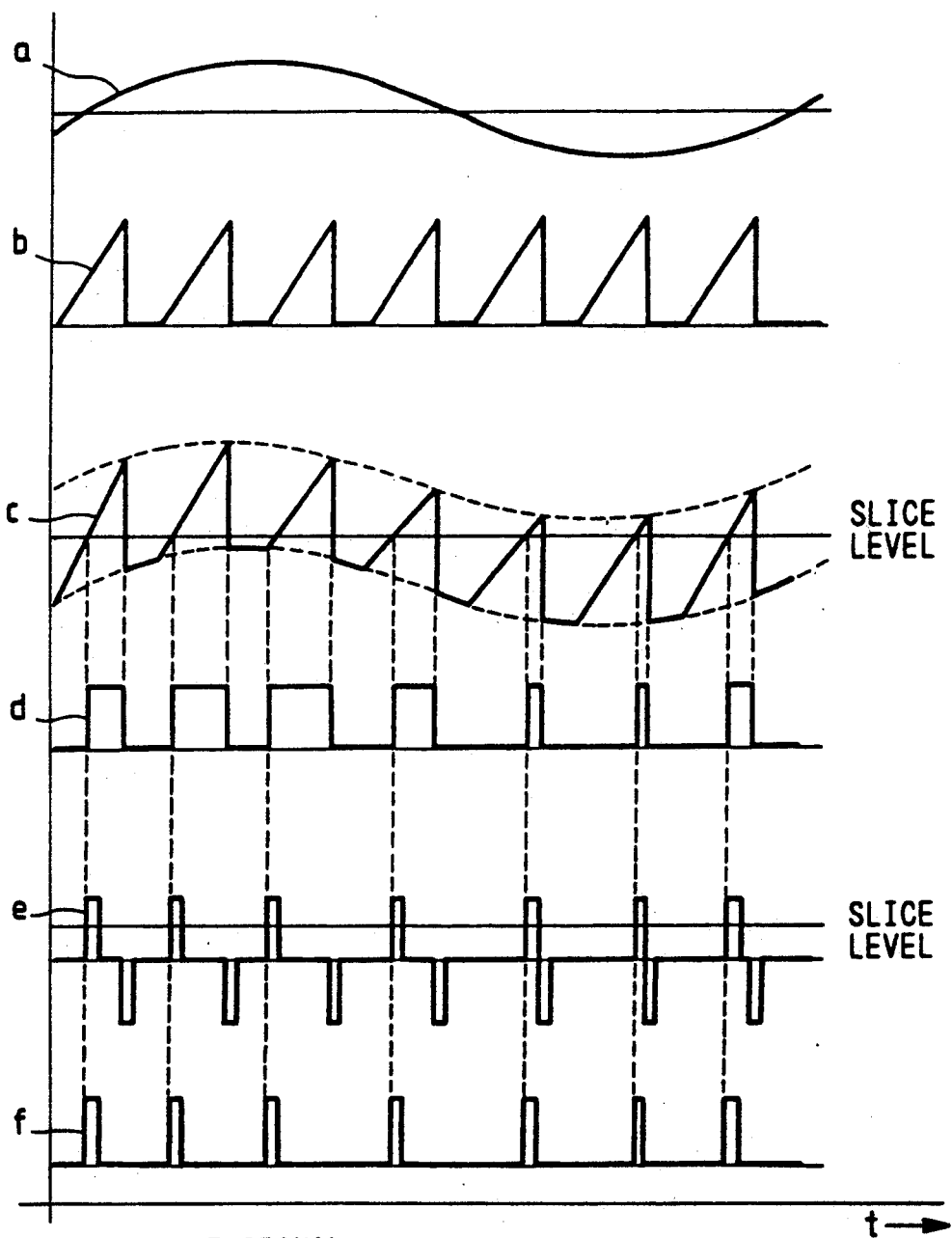
FIG. 2A is a waveshape diagram showing the pulse position modulating operation in the construction of FIG. 1A.
Figure 2B:
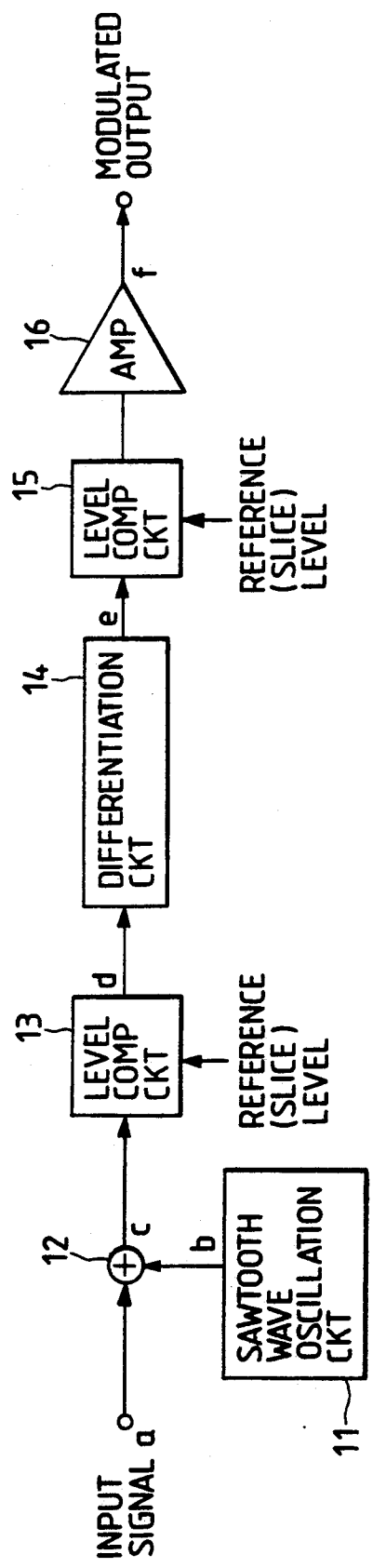
FIG. 2b is a diagram showing the details of a pulse position modulator.
Figure 2C:
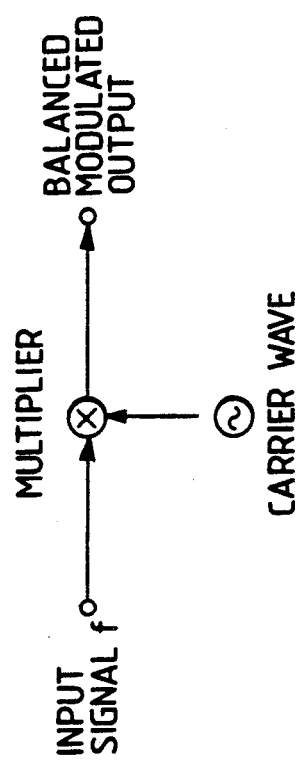
FIG. 2C is a diagram showing the details of a balanced modulator.
Figure 3A:
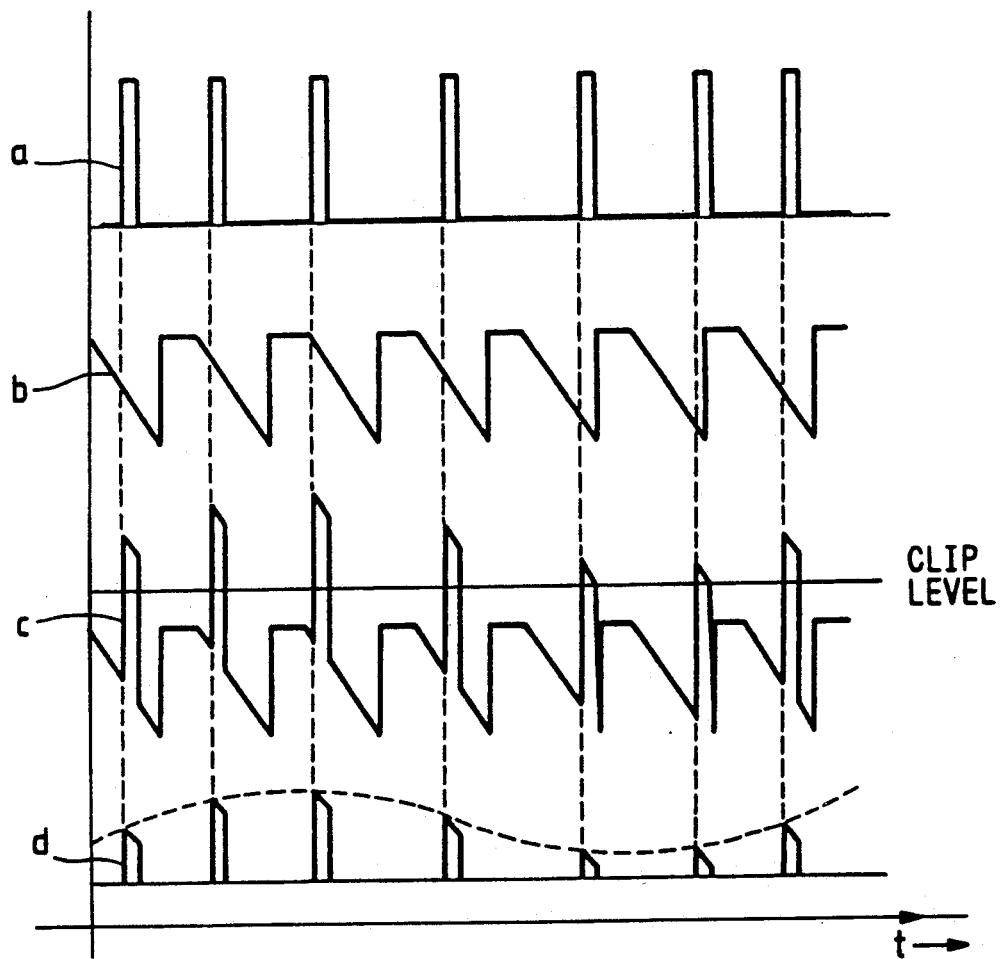
FIG. 3A is a waveshape diagram showing the pulse position demodulating operation in the construction of FIG. 1B.

FIGS. 2A and 3A show examples of the modulating operation of the pulse position modulator 1 in FIG. 1A and the demodulating operation of the pulse position demodulator 5 in FIG. 1B, respectively. FIG. 2B is a diagram showing the pulse position modulator 1. FIG. 2C is a diagram showing the balanced modulator 2. FIG. 3B is a diagram showing the pulse position demodulator 5.

First, the pulse position modulating operation of the pulse position modulator 1 will be described.

In FIGS. 2A and 2B, reference character a indicates an input signal which is input to the pulse position modulator 1. In the diagram, an analog signal is shown as an input signal of the modulator 1 for convenience of explanation.

In FIGS. 2A and 2B, reference character b indicates a sawtooth wave which is generated by a sawtooth wave oscillation circuit 11 provided in the modulator 1. A waveshape indicated by reference character c is obtained by adding the sawtooth wave b and the input waveshape a synthesizer 12.

The signal c is compared with a predetermined slice level by using a level comparison circuit 13 in the pulse position modulator 1. A pulse modulated pulse signal d which is set to the high level when the level of the signal c is larger than the predetermined slice level is obtained.

Further, the signal d is input to a differentiation circuit 14 provided in the modulator 1. A signal e is obtained from the differentiation circuit 14. Then, the signal e is compared with a predetermined slice level by another level comparison circuit 15 different from the comparison circuit 13 and, thereafter, the signal e is amplified by an amplifier 16. A signal f which is set to the high level when the level of the signal e is larger than the slice level is obtained from the amplifier 6.

The signal f which was pulse position modulated by the pulse position modulator 1 is converted into the waveshape which is suitable to be efficiently converted into the chirp signal by the balanced modulator 2 shown in detail in FIG. 2C.

The balanced modulator 2 multiplies a sine wave of a single frequency by the pulse position modulated signal f and outputs a balanced modulated signal.

The balanced modulated signal is converted into the chirp signal by the chirp conversion element for expansion and amplified by the amplifier A. After that, the amplified signal is output to the transmission path such as an optical fiber or the like. The modulated signal input which was transmitted through the optical fiber is amplified by the amplifier A in FIG. 1B. Thereafter, the amplified signal is input to the chirp conversion element 4 for compression. The chirp conversion element 4 inversely converts the chirp signal into the pulse position modulated wave and inputs to the pulse position demodulator 5.

The demodulating operation of the pulse position demodulator 5 will now be described in detail.

In FIGS. 3A and 3B, reference character a denotes a signal which was pulse position modulated by the above procedure. The signal is added by a synthesizer 52 to a counter sawtooth wave as shown by reference character b which is output from a counter sawtooth wave oscillation circuit 51 provided in the pulse position demodulator 5, so that a signal c is obtained.

Subsequently, by clipping the signal c by a level comparison circuit 53 on the basis of a predetermined clip level, a pulse amplitude modulated signal as shown by reference character d is obtained. The signal d is transmitted through a low pass filter 54, so that an original signal shown by a broken line can be obtained.

Figure 4:
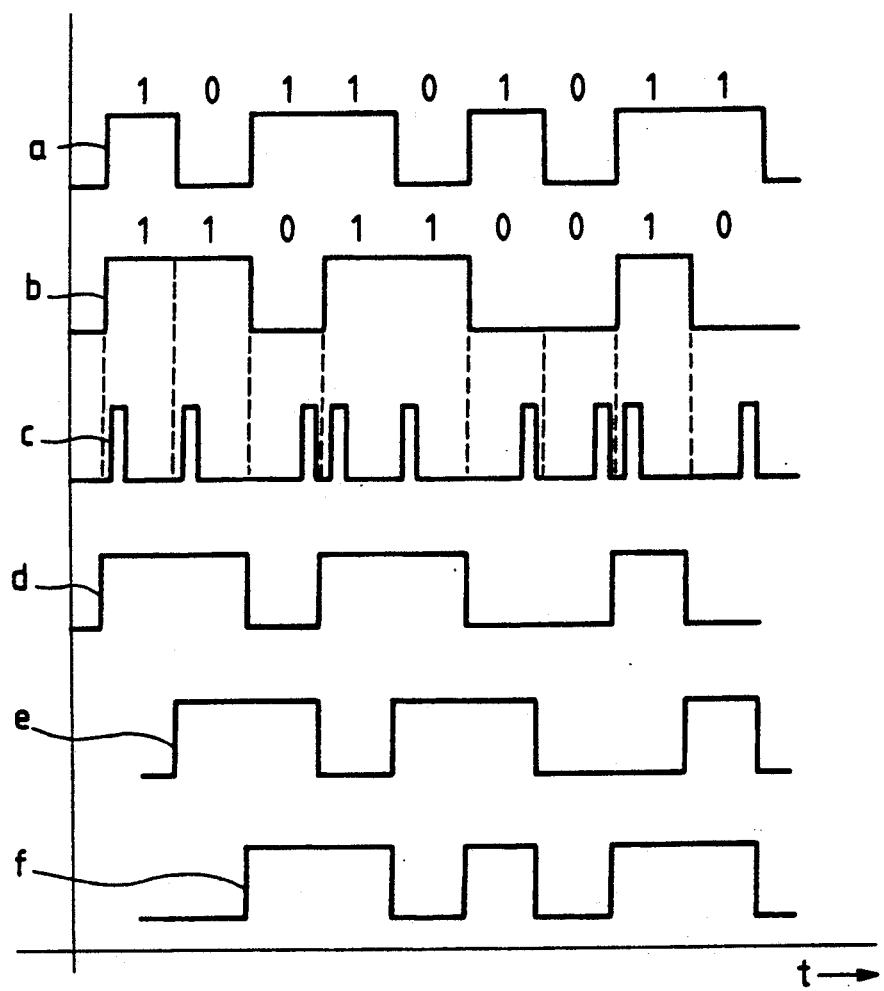
FIG. 4 is a waveshape diagram showing pulse position modulating and demoduating methods of a digital signal.

FIG. 4 shows pulse position modulating and demodulating processes which can be applied to the case where an input signal is a digital signal as different pulse position modulation and demodulation systems.

In FIG. 4, reference character a denotes a serial binary digital signal which is input. By fetching the signal a one bit by one and bit accumulating and adding, a data signal (summation signal) b in FIG. 4 is obtained. Upon accumulation, only one bit of lower one digit is used as a signal.

Further, one time slot is set as shown by a broken line and a short pulse is respectively generated in the former or latter half of the time slot in correspondence to a binary value of "1" or "0" of the signal b, so that the pulse position modulated waveform c can be derived.

On the other hand, when the modulated waveshape shown by reference character c is input, a check is made to see if the short pulse has been generated in the former or latter half of the time slot by using a time slot signal, as a reference, which was generated synchronously with the signal c, so that the signal d can be derived.

Further, by delaying the signal d by one time slot, the signal e is derived. By detecting the phases by using the signals d and e, the demodulated signal f can be obtained.

Structures of the chirp conversion elements of the transmitting and receiving apparatuses will now be described.

FIGS. 5A to 5E show an example of a construction of the chirp conversion element 3 on the transmission side. The chirp conversion element is constructed by a surface acoustic wave-dispersive delay line.

Figure 5A:
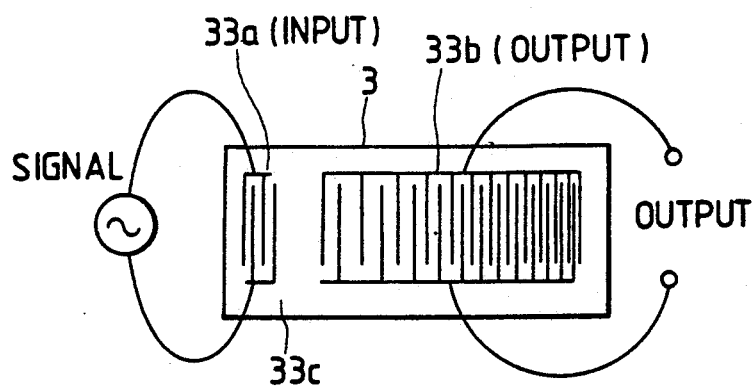
FIGS. 5A to 5E and 6A to 6E are explanatory diagrams showing structures and characteristics of chirp conversion elements for expansion and for compression, respectively.

As shown in FIG. 5A, the chirp conversion element 3 has a structure in which inter digital transducers (hereinafter, abbreviated to IDTs) 33a and 33b are arranged on a piezoelectric substrate 33c having a piezoelectric effect. When an electric signal is applied to the IDT 33a in the signal input section, a mechanical vibration is generated by the piezoelectric effect and the surface acoustic wave of the vibration is propagated on the substrate 33c.

When the surface acoustic wave reaches the IDT 33b in the output section, it is again converted into the electric signal. The IDT 33b on the output side generates an electric signal by tuning with an oscillating frequency which is determined by an interval between the electrodes. However, as shown in the diagram, since the interval of the IDT 33b in the output section densely changes as the position of the electrode is away from the IDT 33a in the input section, the delay time of the output signal differs depending on the frequency.

Figure 5B:
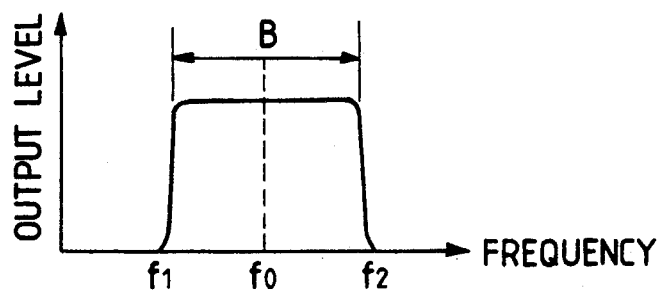
Figure 5C:
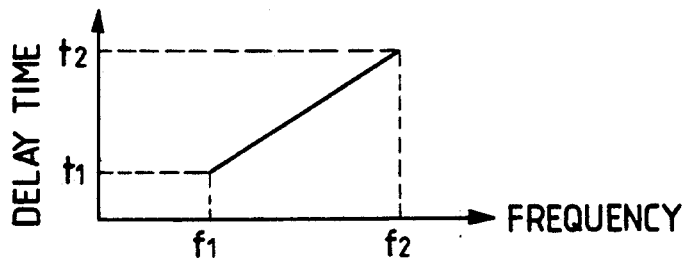

That is, the different frequency components in the signal are separated with respect to the time. Characteristics of the amplitude of the output and the delay time to the input frequency of the chirp conversion element for expansion are as shown in FIGS. 5B and 5C. That is, at least in the region from a frequency $f_1$ to a frequency $f_2$, the frequency characteristics are flat. On the other hand, the delay time linearly increases (time t1 to time t2) from the frequency $f_1$ toward the frequency $f_2$ due to the arrangement of the IDTs.

Figure 5D:
Figure 5E:
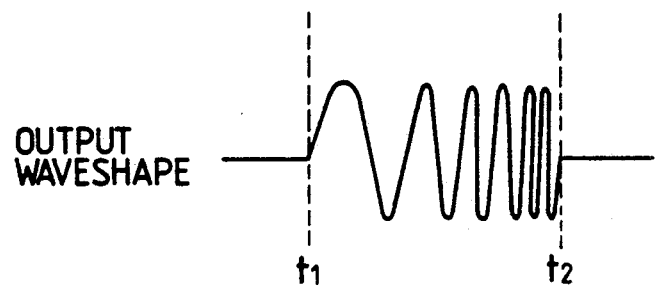

Therefore, when a square wave pulse-shaped signal as shown in FIG. 5D including a harmonic component having spectrum components which extend in the frequency range from $f_1$ to $f_2$ is input to the chirp conversion element 3 for expansion, it is expanded to a waveshape (chirp signal) whose frequency continuously changes from $f_1$ to $f_2$ for the time interval from $t_1$ to $t_2$ as shown in FIG. 5E and the expanded signal is output.

Figure 6A:
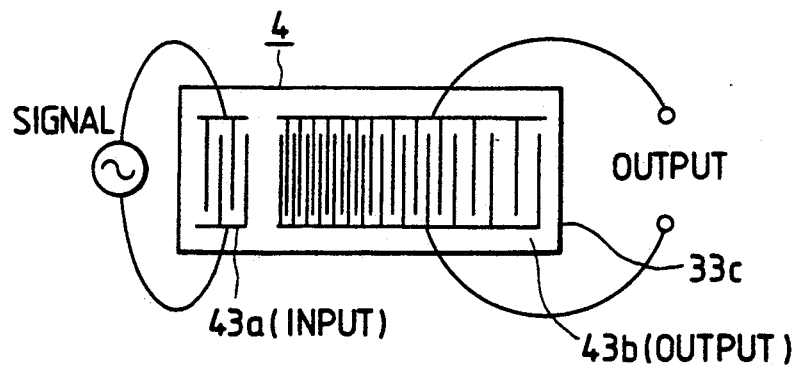
Figure 6B:
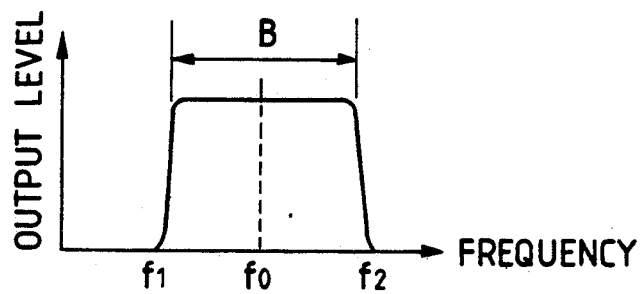
Figure 6C:
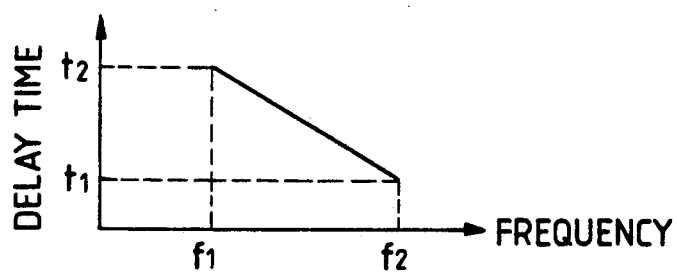

On the other hand, as shown in FIG. 6A, the coarse/dense states of IDTs 43a and 43b of the chirp conversion element 4 for compression in FIG. 1B are opposite to those of the chirp conversion element 3 for expansion. Therefore, as shown in FIG. 6B, although the amplitude characteristics of the chirp conversion element for compression are the same as those of the chirp conversion element for expansion, the delay characteristics in the frequency region from $f_1$ to $f_2$ are opposite as shown in FIG. 6C.

Figure 6D:
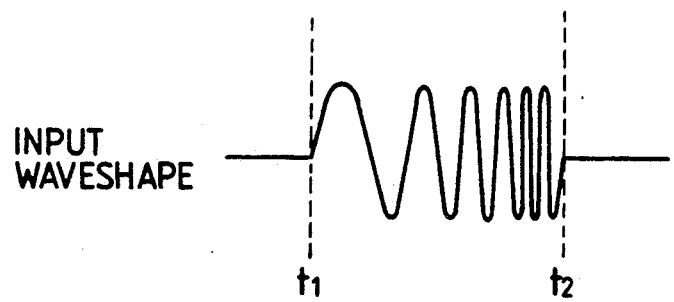
Figure 6E:
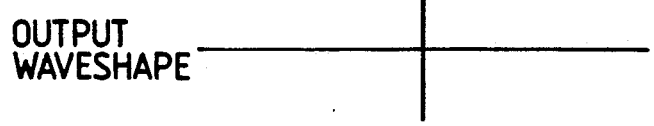

Therefore, when the chirp signal which was generated by the chirp conversion element 3 for expansion and whose frequency continuously changes from $f_1$ to $f_2$ for the time interval from $t_1$ to $t_2$ as shown in FIG. 6D is input, a pulse signal as shown in FIG. 6E is reproduced.

Figure 7:
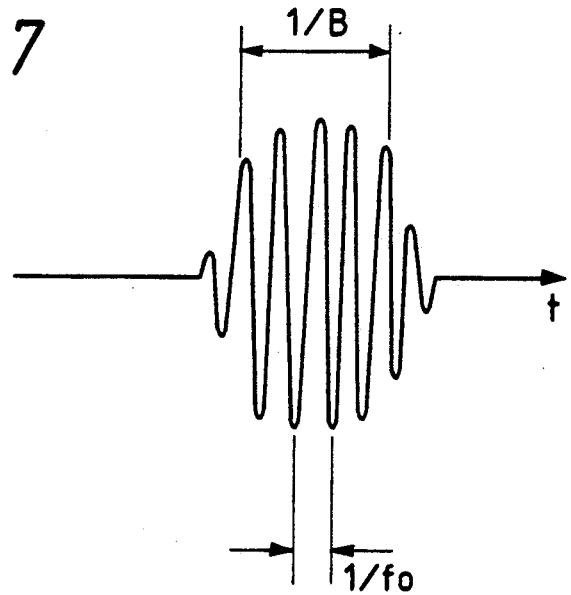
FIG. 7 is a waveshape diagram showing a pulse waveshape which is input to the chirp conversion element.

As an input signal to the chirp conversion element for expansion of FIG. 5, for instance, as shown in FIG. 7, there is used a signal in which a signal of a frequency $f_0$ was multiplied by a single pulse wave of a pulse width 1/B. Such a signal approximately has spectrum components as shown in FIG. 5B or 6B.

On the other hand, a conversion gain from the chirp signal to the pulse signal can be evaluated by the product (BT product) of the continuation time of the chirp signal and the band width. The value of BT product is ordinarily fairly larger than 1. For instance, assuming that B=10 MHz and T=20 nsec, BT=200. The chirp signal is compressed to the pulse signal having a peak electric power which is BT times as large as the electric power of the chirp signal. Thus, the S/N ratio is remarkably improved.

In the information transmission, first, the pulse position modulation is executed by the input analog or digital signal by the pulse position modulator 1 of the transmitting apparatus of FIG. 1A. Further, a waveshape as shown in FIG. 7 is obtained by the balanced modulator 2. After that, the waveshape is converted into the chirp signal. On the other hand, in the receiving apparatus of FIG. 1B, the pulse position demodulation is performed by the waveshape in which the chirp signal was inversely converted into the pulse position modulated wave and the original analog or digital signal is reproduced.

Particularly, in the modulating and demodulating processes of the chirp signal, due to the amplitude and delay characteristics of the output to the input frequency of the chirp conversion element as shown in FIGS. 5, 6B, and 6C, after the pulse signal was converted into the chirp signal, even if the chirp signal is inversely converted into the original pulse signal, the information existing at the pulse position is not lost. Therefore, there is no fear such that binary information is changed. The transmission reliability which is almost equal to or higher than the reliability in the case where different chirp signals are assigned to the binary signal as shown in FIG. 11B can be assured.

On the other hand, since the chirp conversion element for compression on the reception side detects the coincidence of the pattern of the same characteristics as those of the element, the repetitive period of pulses is shorter than the continuation period of the chirp signal, so that even if the chirp signal has been multiplexed on the time base, the signal can be demodulated without any problem.

As shown above, according to the embodiment, information can be certainly transmitted by a simple cheap construction in which single chirp converting means is used in the transmitting and receiving apparatus without being influenced by a disturbance such as noises or the like.

In the embodiment, only the signal modulating and demodulating sections have mainly been shown. However, the present system can be also obviously applied to a wired communication or a radio communication. On the other hand, by using both an apparatus for converting (E/0 conversion) an electric signal to an optical signal and an apparatus for converting (0/E conversion) an optical signal to an electric signal, the present system can be also applied to the light communication.

FIG. 8 shows an example of application of the present system and relates to an embodiment of the communication system in which an optical fiber is used as a transmission path. In the diagram, reference numeral 6 denotes an E/0 converter using a semiconductor laser device or the like, 7 indicates an 0/E converter using a PIN photodiode or the like, and 8 represents an optical fiber. According to the above construction, the reception S/N ratio can be mainly improved as mentioned above and the long distance communication can be executed. In FIG. 8, reference numeral 81 denotes a circuit on the transmission side of FIG. 1A and 82 indicates a circuit on the reception side of FIG. 1B.

Figure 9:
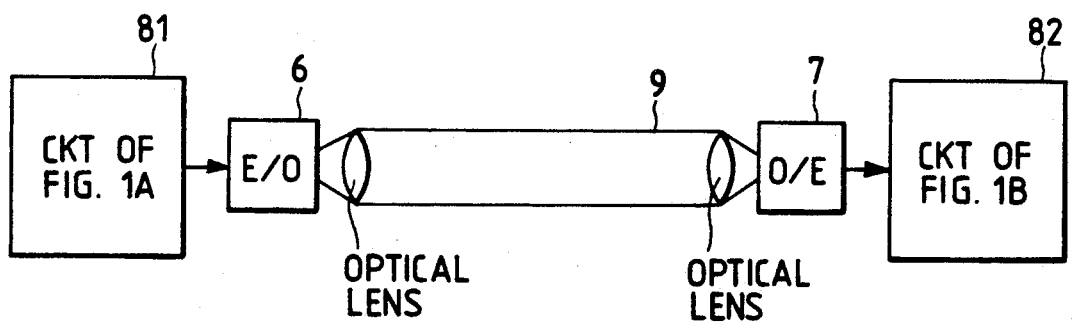

FIG. 9 shows an example in the case where the present system is applied to the optical beam communication. In the diagram, reference numeral 6 denotes the E/0 converter comprising a semiconductor laser device or the like, 7 indicates the 0/E converter comprising a PIN photodiode or the like, and 9 represents an optical beam. According to such a construction, the communication reliability can be largely improved by the eliminating effect of the disturbance noise of the present system because, particularly, in the case of the optical beam communication of a long distance of 1 km or more, the system is strongly influenced by an attenuation, a fluctuation, or the like of the signal due to a meteorological condition such as rain or the like, a fluctuation of the atmosphere, a fluctuation in disturbance light, or the like. In FIG. 9, reference numerals 81 and 82 denote circuits on the transmission side and reception side in FIGS. 1A and 1B in a manner similar to FIG. 8, respectively.

Figure 10:
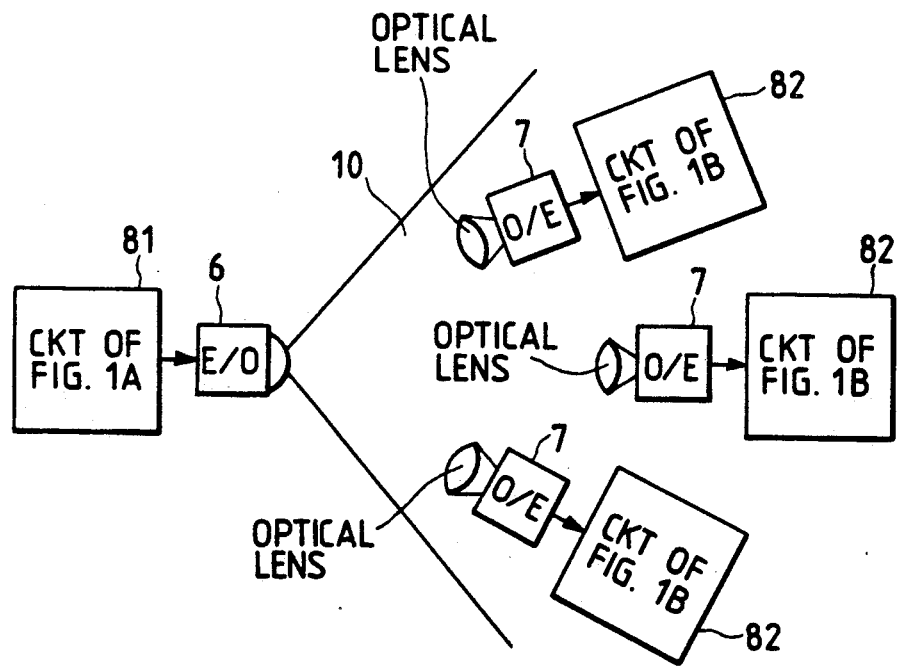
FIGS. 8 to 10 are block diagrams showing different embodiments of the communication system of the invention.

Further, the construction of FIG. 9 can be also applied to a light diffusion communication as shown in FIG. 10. In FIG. 10, a light projecting section of the E/0 converter on the transmission side is constructed so as to project a diffused light by using a proper optical system. The diffused light 10 is received by a plurality of receiving apparatuses similar to FIG. 9 as shown in the diagram.

According to the above construction, a receiving range can be widened by the diffused light. On the other hand, although the optical signal which is received by the receiving apparatus becomes very weak due to the light diffusion, even in the case of using the same transmission power as that in the conventional example, the transmission reliability can be further improved because of the improvement of the reliability of the code discrimination by the conversion gain which is obtained upon chirp counter conversion as mentioned above.

As will be obvious from the above description, according to the invention, in the communication system for transmitting and receiving an input signal through predetermined modulating and demodulating processes, on the transmission side, the input signal is modulated by the pulse position modulation system, the frequency component of the modulated signal is expanded in the time base direction to form the chirp signal, and the chirp signal is transmitted, while on the reception side, the frequency component of the received chirp signal is compressed by the compressing characteristics opposite to the expanding characteristics and, thereafter, the pulse position demodulation is executed, thereby reproducing the original signal. Therefore, after the input signal was pulse position modulated, the modulated signal is converted into the chirp signal having the frequency/time characteristics and the chirp signal is transmitted. On the other hand, on the reception side, after the received chirp signal was inversely converted, the pulse position demodulation is executed, so that the original signal can be reproduced. Particularly, since the signal having information with respect to the pulse position is transmitted and received through the chirp conversion, information existing at the pulse position is not lost. The transmission reliability which is almost similar to that in the conventional example in which different chirp signals are assigned to a binary signal can be assured. On the other hand, the use of the chirp conversion provides advantages such that the code discriminating capability is high and, upon demodulation, an apparent increase in signal electric power occurs due to the compression of the chirp signal and the S/N ratio can be improved. Thus, the communication reliability can be increased. Particularly, even if there is a limitation in transmission electric power on the transmission path and a limitation such that much disturbance noise exists or the like, the reliability of the communication can be assured.

Figure 11A:
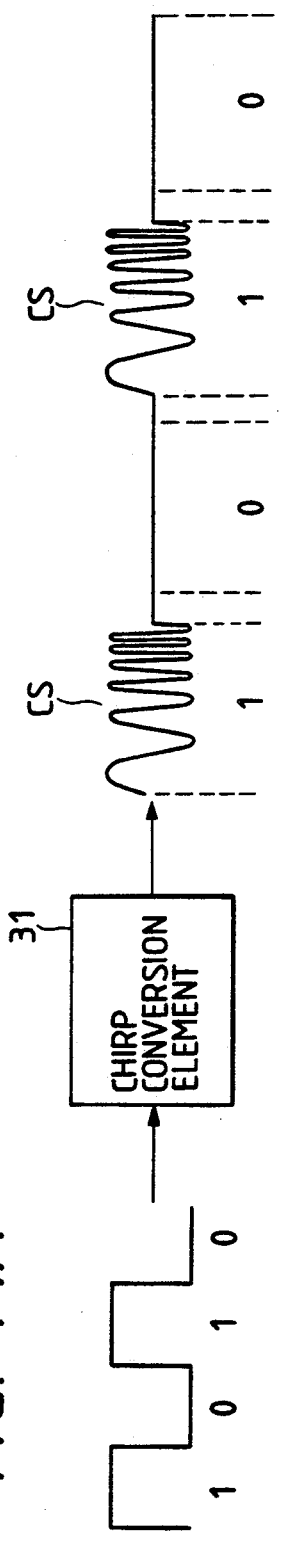
FIGS. 11A and 11B are explanatory diagrams showing different conventional systems.
Figure 11B:
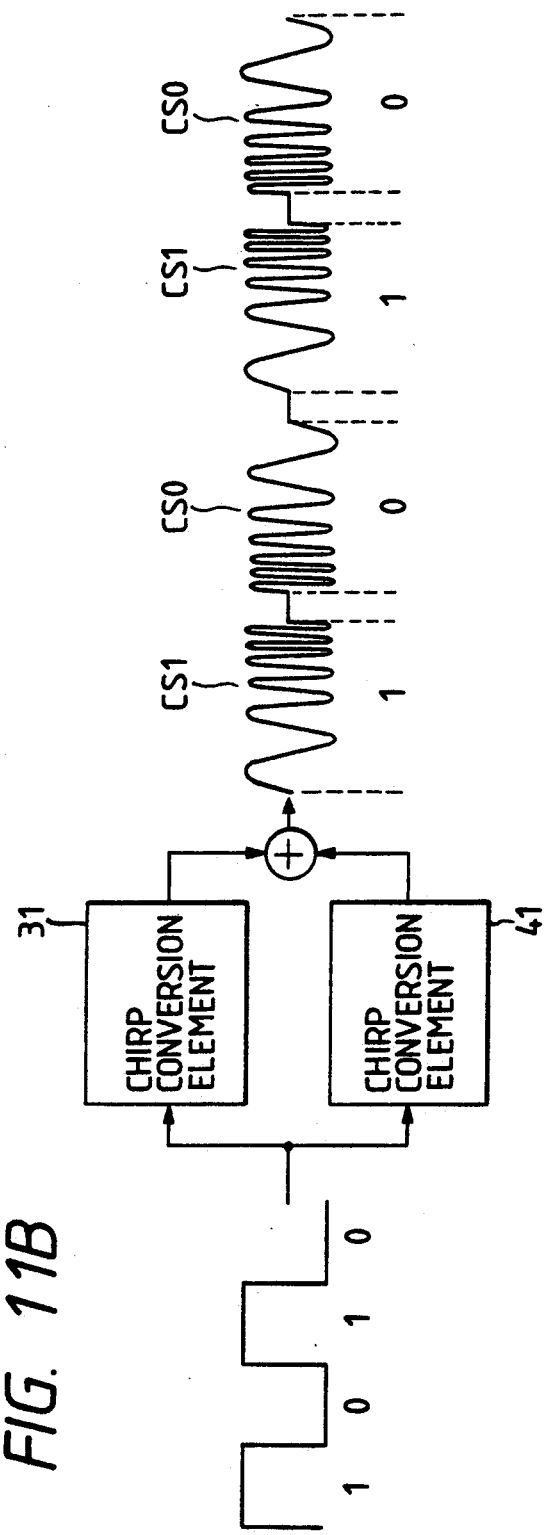

On the other hand, in the examples of FIGS. 11A and 11B, only the digital signal (signal of "1" and "0") can be transmitted and received as a chirp signal. However, after the input signal was pulse position modulated, the modulated signal is converted into the chirp signal, so that the analog signal can be also transmitted and received as a chirp signal.

Although the present invention has been described with respect to the preferred embodiments, the invention is not limited to the foregoing embodiments but many modifications and variations are possible within the spirit and scope of the appended claims of the invention.

We claim:

1. A communication method comprising:
   an inputting step of inputting a signal;
   a pulse position modulating step comprising adding a predetermined analog pattern signal to the inputted signal and pulse position modulating the inputted signal to which the predetermined analog pattern signal has been added, said pulse position modulating step including modulating the inputted signal such that a position of a generated pulse signal is different according to the inputted signal;
   a converting step of converting a modulated signal which was modulated by said pulse position modulating step into a chirp signal; and
   an outputting step of outputting the chirp signal onto a transmission path.

2. A method according to claim 1, further having a step of converting the chirp signal obtained by said converting step into an optical signal, and wherein in said outputting step, said optical signal is output onto the transmission path.

3. A method according to claim 1, wherein the signal which is input by said inputting step is an analog signal.

4. A method according to claim 1, wherein in said pulse position modulating step, a sawtooth wave is added to the input signal and then the resultant input signal is pulse position modulated.

5. A method according to claim 1, further having a step of balance modulating the signal which was pulse position modulated by said modulating step.

6. A method according to claim 1, wherein in said converting step, when the modulated signal is converted into the chirp signal, a surface acoustic wave-dispersive delay line is used.

7. A communication method for executing a predetermined modulating process on an input signal, transmitting and receiving the modulated signal, and executing a predetermined demodulating process on the received modulated signal, comprising:
   on a transmission side, a step of modulating the input signal by a pulse position modulating system and a step of transmitting a chirp signal obtained by expanding frequency components of the modulated signal in the direction of a time base, the pulse position modulating system modulating the input signal being such that a position of a generated pulse signal is different according to the input signal; and
   on a reception side, a step of compressing frequency components of the received chirp signal by compressing characteristics opposite to expanding characteristics and a step of reproducing an original signal by executing a pulse position demodulation after the compressing step.

8. A method according to claim 7, wherein on the transmission side, after the chirp signal is converted into an optical signal, the optical signal is transmitted, while on the reception side, the received optical signal is converted into an electric signal.

9. A method according to claim 7, wherein the time base expansion of the frequency components of the modulated signal and the time base compression of the chirp signal are executed by using a surface acoustic wave-dispersive delay line.

10. A method according to claim 7, wherein on the transmission side, a sawtooth wave is added to the input signal and the input signal is pulse position modulated.

11. A method according to claim 10, wherein on the transmission side, the pulse position modulated signal is balance modulated and the balanced modulated signal is converted into the chirp signal and the chirp signal is transmitted.

12. A communication apparatus comprising:
   inputting means for inputting a signal to be transmitted;
   pulse position modulating means for adding a predetermined analog pattern signal to the inputted signal and pulse position modulating the inputted signal to which the predetermined analog pattern signal has been added, said pulse position modulating means modulating the inputted signal such that a position of a generated pulse signal is different according to the inputted signal;
   converting means for converting the modulated signal which was modulated by said pulse position modulating means into a chirp signal; and
   outputting means for outputting the chirp signal onto a transmission path.

13. An apparatus according to claim 12, further having means for converting the chirp signal which was obtained by said converting means into an optical signal, and wherein said outputting means outputs the optical signal onto the transmission path.

14. An apparatus according to claim 12, wherein the signal which is input by said inputting means is an analog signal.

15. An apparatus according to claim 12, wherein the signal which is input by said inputting means is a digital signal.

16. An apparatus according to claim 12, wherein said modulating means adds a sawtooth wave to the input signal and pulse position modulates the input signal.

17. An apparatus according to claim 12, further having means for balance modulating the signal which was pulse position modulated by the modulating means.

18. An apparatus according to claim 12, wherein when the converting means converts the modulated signal into the chirp signal, a surface acoustic wave-dispersive delay line is used.

19. A communication apparatus comprising:
   inputting means for inputting a signal to be transmitted;
   pulse position modulating means for pulse-position modulating the inputted signal such that a position of a generated pulse signal is different according to the inputted signal;
   balance modulating means for balance modulating the signal which was pulse-position modulated by said pulse position modulating means;
   converting means for converting the modulated signal which was modulated by said balance modulating means into a chirp signal; and
   outputting means for outputting the chirp signal onto a transmission path.

* * * * *

UNITED STATES PATENT AND TRADEMARK OFFICE
CERTIFICATE OF CORRECTION

PATENT NO. : 5,113,278
DATED : May 12, 1992
INVENTOR(S) : YASUSABURO DEGURA ET AL.   Page 1 of 3

It is certified that error appears in the above-identified patent and that said Letters Patent is hereby corrected as shown below: ON THE TITLE PAGE:

AT [54] TITLE

"CHIP" should read --CHIRP--.

COLUMN 1

Line 3, "CHIP" should read --CHIRP--.
Line 56, "made" should read --made to--.

COLUMN 2

Line 26, "made" should read --made to--.
Line 32, "by" should read --of--.
Line 56, "noises" should read --noise--.

COLUMN 3

Line 27, "FIG. 2b" should read --FIG. 2B--.
Line 34, "waveguide a" should be deleted.

COLUMN 4

Line 43, "waveshape a synthesizer 12." should read --waveshape a in a synthesizer 12.--.
Line 58, "amplifier 6." should read --amplifier 16.--.

COLUMN 5

Line 32, "and bit" should read --bit and--.

UNITED STATES PATENT AND TRADEMARK OFFICE
CERTIFICATE OF CORRECTION

PATENT NO. : 5,113,278
DATED : May 12, 1992
INVENTOR(S) : YASUSABURO DEGURA ET AL.   Page 2 of 3

It is certified that error appears in the above-identified patent and that said Letters Patent is hereby corrected as shown below:

COLUMN 6

Line 5, "densely" should be deleted.
Line 6, "changes" should read --changes densely--.
Line 16, "(time t1" should read --(time $t_1$--.
Line 22, "f2" should read --$f_2$--.
Line 25, "t2" should read --$t_2$--.

COLUMN 7

Line 11, "binary" should read --a binary--.
Line 29, "noises" should read --noise--.

COLUMN 9

Line 12, "including" should read --includes--.

UNITED STATES PATENT AND TRADEMARK OFFICE
CERTIFICATE OF CORRECTION

PATENT NO. : 5,113,278
DATED : May 12, 1992
INVENTOR(S) : YASUSABURO DEGURA ET AL. Page 3 of 3

It is certified that error appears in the above-identified patent and that said Letters Patent is hereby corrected as shown below:

COLUMN 10

Line 40, "modulating means" should read
--pulse position modulating means--.

Signed and Sealed this

Tenth Day of November, 1992

Attest:

DOUGLAS B. COMER

Attesting Officer

Acting Commissioner of Patents and Trademarks